Jan. 14, 1964   M. G. MADRAZO ETAL   3,117,868
PROCESS FOR NIXTAMALIZING WHOLE GRAIN HAVING
AN INHERENT MOISTURE CONTENT
Filed Sept. 28, 1961
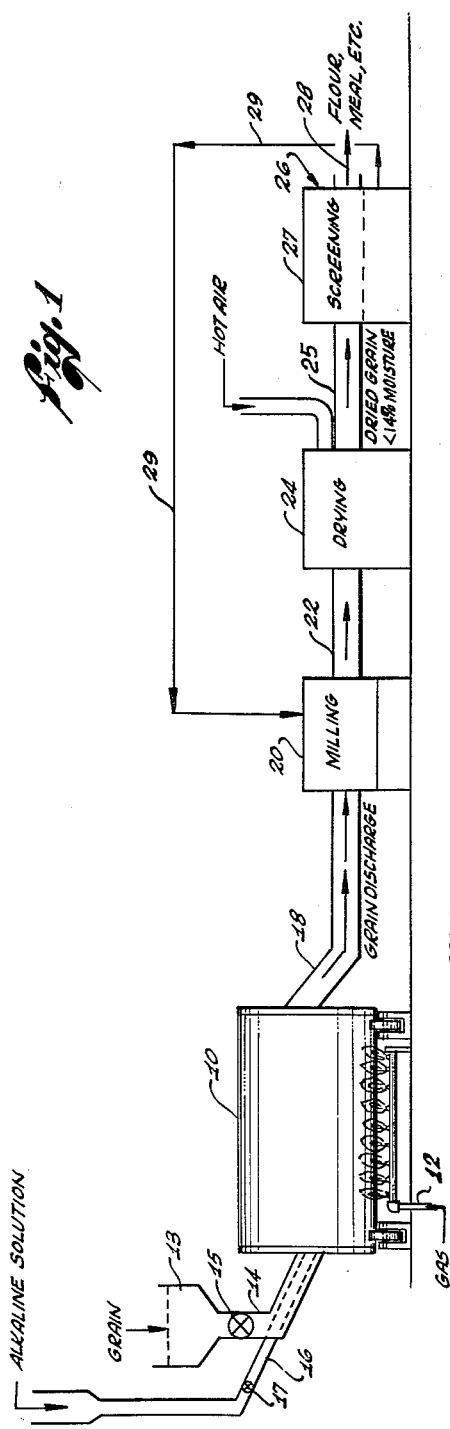
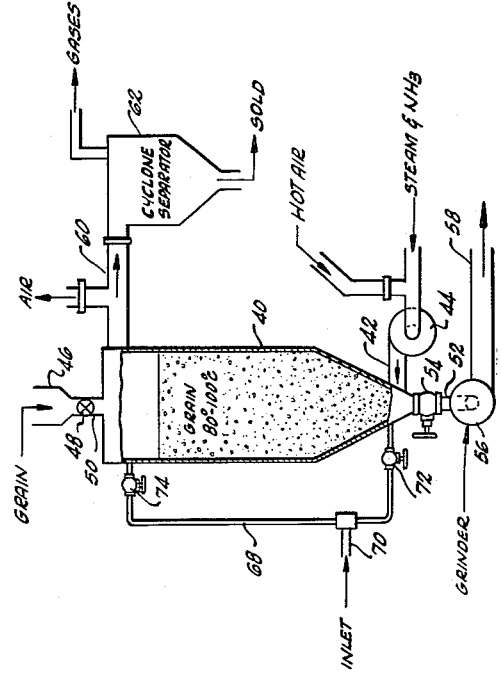
*INVENTORS*
*MANUEL G. MADRAZO*
*GUILLERMO A. CORTINA*
BY
*ATTORNEYS*

United States Patent Office 3,117,868
Patented Jan. 14, 1964

3,117,868
PROCESS FOR NIXTAMALIZING WHOLE GRAIN HAVING AN INHERENT MOISTURE CONTENT
Manuel G. Madrazo and Guillermo A. Cortina, both of Mexico City, Mexico, assignors, by mesne assignments, to Process Millers, Inc., Santa Maria, Calif., a corporation of Nevada
Filed Sept. 28, 1961, Ser. No. 141,472
7 Claims. (Cl. 99—80)

This invention relates to the treatment of grains such as corn, wheat, rye, oats, rice and barley, and it particularly related to a novel process for the treatment of cereal grains, such as those just mentioned and others, wherein a whole grain cereal product, such as a flour or meal, is obtained.

The whole grain cereal product of corn commonly known as tortillas is the traditional food of North and South Americans of Mexican and Indian origin. This whole grain cereal product contains many nutritious substances by virtue of the food value found in both the pericarp or hull as well as in the seed of the grain.

It should be mentioned at the outset that while any whole grain cereal products may be processed according to our invention, the description of the invention will be directed toward the processing of corn, for convenience. Where the processing of any other grain differs in any material aspect, this will be pointed out.

As has been pointed out, the grain contains many substances such as vitamins, fats, minerals and proteins that have substantial food value. However, the grain must be submitted to special chemical treatment if it is to be utilized. Such special treatment is called nixtamalization.

The ancient and time-honored art of nixtamalization practiced by the Indians of Mexico resides in steeping the grain in limewater (a saturated solution of calcium hydroxide) for some time while the solution is being heated. The pericarp is thereby softened and a chemical reaction takes place. The solution is drained off, and the softened grains are milled or ground into a masa or moist dough from which the tortillas are made.

In considering the commercial production of a whole grain cereal product, the nixtamalization of the grain by steeping in a basic solution has several serious drawbacks. First, in the traditional steeping step, a large excess of water and lime is employed, which must subsequently be removed by heating in order to produce a flour of good keeping qualities. The addition and subsequent removal of this excess water makes it extremely difficult to produce a uniform finished product (tortilla flour) of good quality which has not suffered denaturization of certain proteins necessary for maintaining elasticity in the dough, or masa, from which tortillas are made.

The excess of water retained by the grain is disadvantageous in that is severely increases the drying costs. Also, in reducing the moisture content of the grain, the drying must take place in such a way as to avoid denaturing of the corn protein and gelatinization of the starch. It is possible that some destruction of nutritive quality can occur if the drying load is made too severe in order to rid the grain of moisture in an otherwise economical manner.

Further, in a commercial plant operation, the draining of the excess water can cause some difficulty if loss of small grains in the drained off water is to be avoided.

To my knowledge, the prior art has not deviated to any appreciable degree from the traditional mode of nixtamalization of the grain. That is to say, the grain is usually placed in open containers, immersed in a saturated solution of lime, and steeped at a temperature of 80–100° C. until the grain is softened. The subsequent grinding and drying processes have been improved substantially with advancing technology over the manual processes used by the natives; however, the nixtamalization phase of the process has not been substantially changed—notwithstanding the above-mentioned drawbacks occasioned by the use of the usual steeping-type nixtamalization processes. The workers in the art have apparently concentrated on advancing the drying and grinding phases of the processing only.

Bearing in mind the foregoing facts, it is a major object of the present invention to provide a novel and improved process for the treatment of grains to produce therefrom a whole grain product wherein a novel nixtamalization step is employed.

Another object of the present invention is to provide a process for the production of a whole grain cereal flour and meal which includes a novel and improved nixtamalization step resulting in a whole grain product having a relatively low moisture content as compared with other methods of nixtamalization, and achieving thereby better uniformity which favorably affects the grinding of the grain and the keeping qualities of the flour.

A further object of the present invention is to provide a process for the production of a whole grain cereal flour or meal wherein the drying or dehydration of the nixtamalized grain is minimized and in some instances, completely obviated thereby, significantly reducing the cost of production of the flour or meal while, at the same time, producing a grain of uniform quality and of high nutritive value, because the lipo-protein complexes are broken down and assimilable compounds are formed.

Still a further object of our invention is to provide an improved process for the nixtamalization of cereal grains wherein softening of the hull or pericarp of the grain is obtained without any appreciable reduction in the minerals, fats, oils, proteins, and vitamins originally contained therein, the resulting nixtamalized grain having a water stantially less than has been thought mandatory heretofore.

These and other objects of our invention will become clearly understood by referring to the following description, and to the accompanying drawings, in which:

FIGURE 1 is a schematic diagram showing the various steps in our process; and

FIGURE 2 is a side elevational view of a modification of a nixtamalization chamber employed in our process.

In general, our process provides a nixtamilization of the grain without requiring a steeping of the grain in aqueous alkaline solution. The usual nixtamalization process probably includes the following reactions (although we do not mean to be bound by the theories here advanced): conversion of cellulose in the hull to hemicellulose; conversion of other components of the hull to mucilaginous dextrins and monosaccharides and rendering the hull more assimilable or digestible by formation of basic salts; and breakup of organic complexes such as the lipo-proteic complexes to render them more assimilable or digestible by transforming them into assimilable salts. For the purposes of this specification and claims, nixtamalization occurs when about 20% of the crude fiber of a kernel of grain has been converted to digestible hemicellulose and monosaccharides.

We have found that our nixtamalization process makes full use of the nutritive constituents of the hull, makes the whole grain more digestible, reduces the loss of water-extractible compounds of the grain to a minimum, and brings about the loosening of the outer bran layer from the inner bran layer of the grain in an easier and more rapid manner. This is accomplished through the action of the combination of hot water vapors and either certain gaseous liquid, or solid substances. This group of substances includes any which when dissolved in water give to the resulting solution a pH greater than 7. The water vapors can be maintained above atmospheric pressure for greater reactivity with the grain. This combination can be introduced simultaneously or alternately, although their simultaneous use is preferred. In some cases, damage to the starch or gluten of the grain may occur because of too high a temperature. When nixtamalization temperatures are too high for treating certain grains they can be reduced by application of a vacuum to the system for bringing about pressures below atmospheric.

In one form of our invention, the alkaline reagents contact the grain in the form of an aqueous solution of these reagents—and water vapors are evolved during treatment of the grain. The aqueous alkaline solution may be introduced into the grain as a finely dispersed fog or atomized vapor by the use of suitable blower and fog nozzles. The amount of aqueous alkaline solution employed in any case, is a relatively small amount compared to that ordinarily used in the prior art, and the grain never reaches its moisture saturation level.

We have found that if the whole grains are treated in a closed vessel at temperatures of preferably between 50° C. and 100° C. with an amount of alkaline solution equal to from between 15% to 35% by weight of the weight of the grain (but always below a saturation amount), the hull of the grain is completely softened, nixtamalized, and ready for grinding.

Nixtamalization proceeds as in the normal processing, but the amount of moisture taken up by the grain will be substantially lower than in prior art processes. This fact leads to the very significant advantages both in the quality of the grain and in later processing. For example, grinding and drying of the whole grain are much more economically performed because of the reduced moisture content. Also, in many instances, the usual subsequent drying step can be completely eliminated.

While the alkaline solution may be a saturated limewater solution, as in the past, any nontoxic alkaline solutions may be used, such as solutions of monosodium, disodium, or trisodium phosphate, or sodium or potassium hydroxide. Volatile alkaline solutions, such as ammonium hydroxide solutions, are also advantageously employed. The pH of the alkaline solution thus will vary from as high as 14 (in a saturated limewater solution) to as low as 8 (in a dilute ammonia solution). Further substances which are gases at temperature and pressure of operation may be employed, if they produce a pH greater than 7 in contact with water. An example of such a gas is ammonia (there is always occluded water in the grain, and the ammonia forms the hydroxide with this water).

It is believed that the reason that proper hydration of the grain occurs, and thereby proper nixtamalization, in the presence of alkaline solution but in the "absence of steeping amounts thereof" is this: the grain is made much more susceptible to reaction with the alkali by virtue of the action of the hot water vapors.

Thus in the case of nonvolatile alkaline solutions, such as limewater, if 20% of solution, by weight of the grain, is employed and the nixtamalization proceeds in a closed vessel at 90° C., the water vapors and the alkaline solution both contact the grain, and over the period of 10–30 minutes or more, the nixtamalization is completed. The total water content of the nixtamalized grain will be less than its saturation level.

The range in pressures during nixtamalization can vary from a vacuum pressure, i.e., below atmospheric pressure, to 60 p.s.i. (or higher) in the case of volatile ammonia solutions. Where high temperatures have an unfavorable effect on the grain, below atmospheric pressures can be employed in order to induce vaporization of the solution at lower temperatures. Generally, atmospheric pressures are maintained during nixtamalization.

The alkaline solutions are preferably directly added to a rotatable pressure vessel or to a pressure vessel having means for agitating or stirring its contents. Also, in the case of use of volatile alkaline solutions, the solution can be introduced directly as a vapor into the pressure vessel. In any event, the pressure vessel can be maintained at a temperature of between 50° C. and 100° C. by any suitable means.

At the end of the nixtamalization, the grain is discharged from the pressure vessel. No water is drained from the grain since the grain has absorbed all of the water present but has not reached its saturation level. In the ordinary nixtamalization, at the end of the steeping operation, the steep water must be drained off by some means or other, which usually involves the loss of small particles of grain in the drain water.

The nixtamalized grain is then ready to be milled.

The wet grain of our process, containing 5% to 35% moisture (dry basis), and well below a saturation amount, is preferably ground in an impact mill, preferably a hammer mill of the type referred to as a pulverizer mill. These impact mills are old and well known in the art and are available in various types, sizes and constructions.

The grain, if its moisture content is greater than about 12%, is fed directly from the mill into a drying apparatus. Preferably, a "flash drier" type is used that embodies the basic principles of instantaneous drying. The ground grain falls into a drying duct through which passes a current of hot gases or hot air at a temperature of between 250° C. and 400° C. The total length of the drying duct is such as to cause contact of the grain and gas for between a fraction of a second and several seconds. In any event, the drying is conducted so that the time of contact of the stream of hot gases with the grain is never long enough to enable the solid grain to reach a temperature above that which would enable denaturization of the protein and denaturization of the starch and the grain to occur. This temperature above which the solid grain should not go varies from grain to grain but generally is in the neighborhood of 75° C. The drying can be brought about by a hot gas other than oxygen or air (e.g., nitrogen), in which case the temperature can be higher.

At the completion of the drying cycle, the dried grain is separated from the gases in a conventional manner, e. g., a cyclone-type separator.

Preferably, the moisture content of the finished flour or meal is between about 5% to about 12% (dry basis). If the moisture content is allowed to remain at 14% or higher (dry basis), the keeping qualities of the flour or meal are greatly impaired.

The dried milled grain is then classified, preferably by use of a rotary screen, and the coarser particles are then returned to the hammer mill to be reground in the dry state and reduced to the desired size.

The final whole grain product, e.g., meal or flour, may be converted into a dough at a later time by the simple addition of about an equal weight of cold water. The dough thus prepared has all the properties considered desirable for the making of tortillas, e. g., elasticity, stability, smoothness of texture, and is unform in quality.

Referring now particularly to FIGURE 1, a presently preferred mode of nixtamalization of the grain by means of an alkaline solution and subsequent processing is shown in schematic form. (FIGURE 2 is a schematic representation of an apparatus for nixtamalization by means of vapors only.)

The pressure vessel employed, designated by numeral 10, is in the form of a rotating drum. The vessel 10 is externally fired by means of combustion of gases entering a gas line 12 positioned below the drum. The grain is introduced into the rotating drum from hopper 13, via line 14, and an appropriate alkaline solution such as saturated limewater solution is introduced into the drum via the conduit 16 entering the same end of the drum 10. The liquid may be sprayed into the grain, if desired.

In a batch operation, valves 15 and 17 located in lines 14 and 16, respectively, are closed after introduction of the solution and grain. The drum is heated, while rotating, for a sufficient period of time to enable the nixtamalization to go to completion, or near completion.

In a continuous operation, the valves 15 and 17 are left open for continuous inflow of ingredients.

The nixtamalized grain is discharged from either the batch or continuous operation via line 18 and is sent to the impact mill in milling zone 20, thence via line 22 to the drying zone 24, and finally to a screening zone 27, via line 25, in zone 26. The coarse particles are returned, via line 29, for remilling in zone 20. The product, e. g., flour or meal, leaves zone 26 via line 28.

In FIGURE 2 a presently preferred means for nixtamalizing grain solely by means of incoming alkaline vapors is shown. This apparatus can be employed in a continuous or in batch processing. Vapors, e.g., steam and ammonia, are blown into the bottom of the nixtamalizing tower 40 via line 42 and blower 44. Grain is fed continuously or batch-wise to the tower 40 from hopper 46, hopper 46 being controlled by valve 48 in inlet line 50. The vapors pass upwardly through the tower 40 thereby nixtamalizing the grain. The time for nixtamalization can be controlled by the length of time of contact of the steam and ammonia with the grain. A great variety of nixtamalizing conditions can be obtained in this manner.

After the grain has been nixtamalized it is purged of all chemical vapors and partially dried by introducing hot air through blower 44. The grain is then discharged continuously or batch-wise from tower 40 via line 52 upon opening of the valve 54 and sent to a grinder of the impact mill type designated by the numeral 56. The grain may be sent to a drying operation, if necessary (via line 58). The grain is then screened as described with reference to FIGURE 1.

The vapors, after having contacted the grain, are discharged from the top of the tower, via line 60, and are sent to a cyclone separator 62. Any entrained solids are combined with the discharged grain while the gases are returned to a condenser and accumulator for later reuse in the nixtamalization process (not shown).

The recirculating line 68 is employed for the purpose of cleaning the interior of the tower. A washing fluid enters line 68 via inlet line 70. With lower valve 72 open and upper valve 74 closed, the wash fluid can fill tower 40. The upper valve 74 is then opened and the wash fluid recirculated downwardly through line 68 and into tower 40, under pressure, for as long a period as is required. Wash water for the washing of the grain itself can also be introduced through line 68 via inlet line 70 and recirculated through the grain.

The continuously discharging nixtamalized grain is sent to the various drying, grinding, screening and remilling steps as above described with reference to FIGURE 1.

Specific examples of our nixtamalization process are now set forth. The drying, where necessary, and grinding are conventionally accomplished.

*Example 1*

1,000 parts of wheat is introduced into a rotatable cylindrical pressure vessel such as shown in FIGURE 1; 250 parts of a limewater solution, containing 0.5 calcium hydroxide [$Ca(OH)_2$], is also introduced into the pressure vessel. The pH of the alkaline solution is 12. The pressure vessel is maintained at a temperature of approximately 100° C. by means of external firing of the pressure vessel for a period of approximately 32 minutes.

The amount of solution employed, relative to the amount of grain, only partially immerses the grain. At the end of the 32-minute period, the solution is completely absorbed by the grain. The moisture content of the grain discharged from the pressure vessel is approximately 28%, less than its saturation level (which is about 50%).

*Example 2*

The procedure of Example 1 is followed with the exception that the grain nixtamalized is barley.

*Example 3*

The procedure of Example 1 is followed with the exception that 0.5 by weight of the limewater solution is calcium lactate. The lactate salt is a water-soluble calcium salt and is used to introduce more calcium into the grain structure.

*Example 4*

1,000 parts of soybeans was introduced into the rotating pressure vessel along with 200 parts of a 1.5 aqueous solution of calcium hydroxide. Treatment of the grain in the pressure vessel takes place for 48 minutes, at which time the grain is discharged having a moisture content (on a dry basis) of about 23%.

*Example 5*

1,000 parts of corn is partially immersed in 300 parts of a 2% solution of calcium hydroxide. The pH of the solution is 12; the time of nixtamalization is 40 minutes at a temperature of 93° C.

The moisture content of the discharged grain is 34% (dry basis). No liquid is discharged, the grain absorbing the entire amount of solution originally introduced.

*Example 6*

The same procedure as in Example 5 is followed with the exception that the grain treated is sorghum. The resulting moisture content is the same as in Example 5.

*Example 7*

1,000 parts of corn is introduced into the pressure vessel of FIGURE 1 along with 250 parts of a phosphate buffer solution having a pH of about 11.2. A mixture of trisodium and disodium phosphates is employed as the means for obtaining the desired alkalinity. The temperature of 96° C. was maintained in the closed pressure vessel and the period of nixtamalization was 63 minutes. A moisture content of 27% resulted.

*Example 8*

The procedure of Example 7 was used with the exception that sorghum was the grain treated. The resulting moisture content is the same as in Example 7.

*Example 9*

1,000 parts of corn was added to the nixtamalization tower of FIGURE 2 along with 25 parts of ammonium hydroxide at a temperature of 60% C. and atmospheric pressure. Nixtamalization takes place in a period of 40 minutes.

The grain discharged contained its original moisture, about 8% on a dry basis, and no additional drying of the grain was required.

*Example 10*

The procedure of Example 9 was followed with the exception that wheat was the grain treated. The results were the same as for those set out in Example 9.

*Example 11*

1,000 parts of corn was added to the tower 40 along with 15 parts of steam by weight and 1.1 parts of ammonium hydroxide (calculated as ammonia). The temperature in the tower was maintained at approximately 96° C. for one hour.

The grain discharged had a moisture content of about 18% and was thoroughly nixtamalized.

*Example 12*

The procedure of Example 11 was followed with the exception that wheat was treated. The results were the same as for those set out in Example 11.

*Example 13*

1,000 parts of corn was charged to the tower of FIGURE 2; 15 parts of water vapor, at 96° C. and at atmospheric pressure, was introduced into the tower for a period of 15 minutes. The water vapor was then purged with dry air and a total amount of 4 parts of ammonia, at a temperature of 60° C. and at a pressure of 15 lbs., was introduced into the tower. The ammonia and grain are left in contact for a period of approximately one hour and the ammonia is then purged from the tower by means of air. The grain discharged was thoroughly nixtamalized and had a moisture content of 9%. The moisture content was sufficiently low so that a drying step was unnecessary.

In all of the examples, nixtamalization was complete.

It will be seen from the foregoing that the process here disclosed is novel in many respects and is highly advantageous both from the point of view of obtaining a meal or flour high in nutritional value of uniform quality and by a highly economical process.

While changes and modifications may be made in our process, we do not intend to be limited by the specific embodiments here shown and described, but rather intend to be limited only by the claims which follow.

We claim:

1. In a process for treating whole grain having an inherent moisture content, the improvement which comprises: contacting the grain with an alkaline substance selected from the group consisting of calcium hydroxide, sodium hydroxide, potassium hydroxide, soluble phosphate salts, and ammonia in a closed system having a temperature of between about 50° C. to 100° C., the amount of water present in said system ranging between that present as inherent moisture in said grain and 35% water, by weight, of the weight of the grain (dry basis); and maintaining said contact for a period of at least about ten minutes to cause said grain to have from between that percentage of water substantially equal to said inherent moisture content and 35% water (dry basis).

2. The process of claim 1 wherein said whole grain is selected from the group consisting of corn, wheat, rye, oats, rice and barley.

3. A process for preparing flour and meal from whole grain having an initial inherent moisture content which comprises the steps of: contacting said whole grain with an alkaline substance selected from the group consisting of calcium hydroxide, sodium hydroxide, potassium hydroxide, soluble phosphate salts, and ammonia in a closed system having a temperature of between about 50° C. to 100° C., the amount of water present in said system ranging between that present as inherent moisture in said grain and 35% water, by weight, of the weight of the grain (dry basis); maintaining said contact for a period of at least ten minutes to cause said grain to have from between that percentage of water substantially equal to said inherent moisture content and 35% water (dry basis); and milling and drying said wet grain to a moisture content of between 5 and 14% (on a dry basis).

4. In a process for nixtamalizing whole grain having an inherent moisture content, the improvement which comprises: partially immersing said grain in a non-toxic aqueous alkaline solution, the total amount of water present being equal to that in said aqueous alkaline solution together with said inherent moisture content in said grain and being not greater than 35%, by weight, of the weight of said grain (dry basis) and the pH of the resulting solution being between 7 and 14; and heating the solution and said grain at a temperature between 50° C. and 100° C., in a closed system for a sufficient period of time to enable said grain to have from between 8% to 35% (dry basis) of water, the final water content being greater than said inherent moisture content initially present in said grain.

5. In a process for nixtamalizing whole grain having an inherent moisture content, the improvement which comprises: contacting said grain with an aqueous solution of calcium hydroxide having a pH of between 8 and 14 in a closed system having a temperature of about 50° C. to 100° C., the total amount of water present in said system weighing more than 15% of he weight of said grain (dry basis) but less than the 35% of the weight of said grain (dry basis); and maintaining said contact of said aqueous solution and grain for a period of time sufficient for said grain to attain a moisture content of between 15% and 35% of the weight of said grain (dry basis).

6. In a process for nixtamalizing whole grain, the improvement which comprises: contacting 100 parts of said grain (dry basis) with 8–35% by weight of water and an amount of ammonia which, when dissolved in said water, gives to a resulting solution of pH of between 7 and 14, in a closed system, at a temperature of between 50° C. and 100° C. for a sufficient period of time to enable the grain to have from between 8% to 35% water (dry basis).

7. A process for preparing a tortilla flour from a whole cereal grain which comprises: contacting 100 parts of said grain (dry basis) with 8–35%, by weight, of water and ammonia, said ammonia, when dissolved in said water, resulting in a solution having a pH of between 7 and 14, in a closed system at a temperature between 50° C. and 100° C., for a sufficient period of time to nixtamalize said grain and to enable said grain to have from between 8% to 35% water (dry basis); and milling said grain and drying said milled grain to a moisture content between 5% and 14%.

References Cited in the file of this patent

UNITED STATES PATENTS

| | | |
|---|---|---|
| 85,261 | Weiss | Dec. 22, 1868 |
| 826,983 | Wreford et al. | July 24, 1906 |
| 1,221,636 | Von Hagen | Apr. 3, 1917 |
| 1,265,700 | Von Hagen | May 7, 1918 |
| 2,237,090 | Sasse | Apr. 1, 1941 |
| 2,584,893 | Lloyd et al. | Feb. 5, 1952 |
| 2,704,257 | De Sollano et al. | Mar. 15, 1955 |
| 2,930,699 | De Sollano et al. | Mar. 29, 1960 |